Nov. 3, 1953
A. P. BRUNDAGE
2,657,494
APPARATUS FOR FISHING THROUGH ICE
Filed May 8, 1951
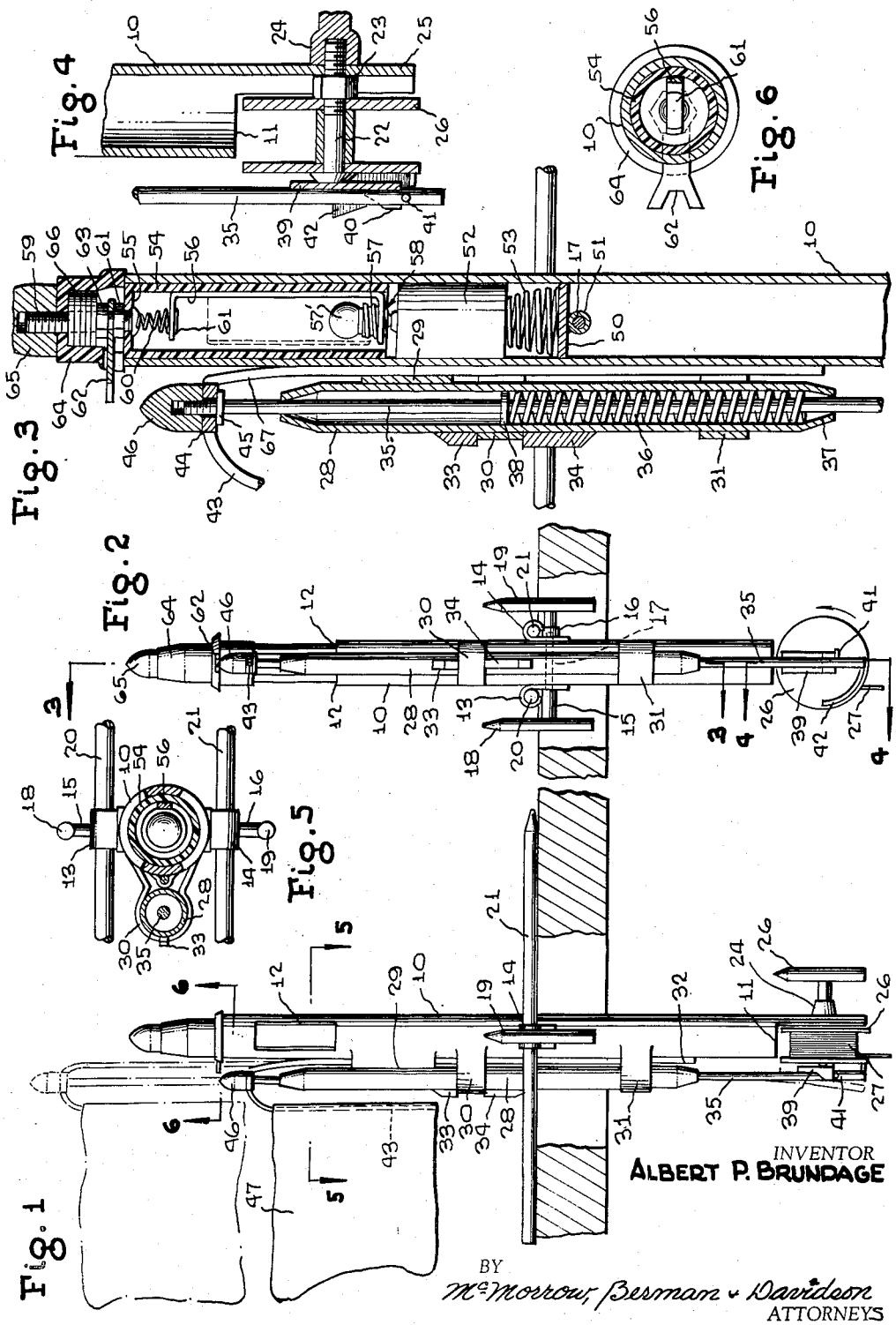
INVENTOR
ALBERT P. BRUNDAGE
BY
McMorrow, Berman & Davidson
ATTORNEYS Patented Nov. 3, 1953

2,657,494

UNITED STATES PATENT OFFICE 2,657,494

APPARATUS FOR FISHING THROUGH ICE

Albert P. Brundage, Walden, N. Y.; Isabel D. Brundage, administratrix of said Albert P. Brundage, deceased Application May 8, 1951, Serial No. 225,153

5 Claims. (Cl. 43—17)

1

This invention relates to fishing apparatus and more particularly to automatic signaling apparatus for fishing through ice.

It is among the objects of the invention to provide improved apparatus for fishing through ice which apparatus supports a fish line and reel in the water below ice on which the apparatus is supported so that the line and reel will not freeze and a fish can take the line off of the reel at a rate such that the line will not break; which provides a mechanical and an electric signal device which are automatically actuated by a pull on the line and in which the electrical signal device can be rendered operative or inoperative as desired; which supports the signal devices a sufficient distance above the ice to render the signal clearly visible; which can be collapsed into a compact package for transportation and storage; and which is simple and durable in construction, economical to manufacture and neat and attractive in appearance.

Other objects and advantages will become apparent from a consideration of the following description and the appended claims in conjunction with the accompanying drawing, wherein:

Figure 1 is a side elevational view of fishing apparatus illustrative of the invention with the apparatus shown in operative position;

Figure 2 is an elevational view with the apparatus rotated 90° from the position illustrated in Figure 1;

Figure 3 is a fragmentary cross sectional view on an enlarged scale on the line 3—3 of Figure 2 showing the upper portion of the apparatus;

Figure 4 is a fragmentary cross sectional view on an enlarged scale on the line 4—4 of Figure 2 showing the lower part of the apparatus;

Figure 5 is a transverse cross sectional view on an enlarged scale on the line 5—5 of Figure 1; and Figure 6 is a transverse cross sectional view on an enlarged scale on the line 6—6 of Figure 1.

With continued reference to the drawing, the apparatus comprises an elongated tubular support 10 having a longitudinally extending recess 11 at one end and being slightly tapered toward its other end and provided near its other end with rectangular openings 12 constituting signal windows.

Partly circular clamps 13 and 14 are secured to the tubular support 10 at diametrically opposite sides of the support and intermediate the length of the support by nuts 15 and 16 threaded onto the opposite, screw threaded ends of a bolt 17, which extends transversely through the

2 support. The nuts 15 and 16 are provided respectively with handles 18 and 19 which are spaced from the support 10 and substantially parallel to a plane including the longitudinal center line of the support. Elongated bars 20 and 21 extend through the clamps 13 and 14 respectively so that the clamps are located substantially at the midlength locations of the corresponding bars and these bars are movable by loosening and tightening the nuts 15 and 16, between a folded position in which they extend along the support 10 and an extended position in which they are disposed substantially perpendicular to the support, as illustrated in Figures 1 and 2, for holding the support in upright position in a fishing hole in ice.

A reel axle 22 is secured to the support 10 at the recessed end of the latter and is disposed substantially perpendicular to the longitudinal center line of the support. This axle has a screw threaded portion extending through an aperture in the portion of the support adjacent the recess 11, and nuts 23 and 24 are threaded onto the screw threaded portion of the axle at respectively opposite sides of the extending portion 25 of the support to clamp the axle to the support, the outer nut 24 having a handle 26 thereon spaced from the support and disposed substantially parallel to a plane including the longitudinal center line of the support.

A reel 26 is mounted on the axle 22 and disposed in the recess 11 and a fishing line 27 is wound on the reel.

An elongated sleeve 28 is secured to the support 10 and extends longitudinally of the support intermediate the length thereof. The support is provided with a saddle formation 29 against which the sleeve bears and with band formations 30 and 31 which extend around the sleeve at locations spaced apart along the latter to securely clamp the sleeve to the support. The saddle formation is disposed above the upper band 30 and a rest formation 32 is provided adjacent the lower band 31 to firmly support the sleeve against the support. The sleeve is provided with outwardly extending lug formations 33 and 34 disposed respectively at the upper and lower sides of the band formation 30 to hold the sleeve against movement longitudinally of the support.

A rod 35 extends longitudinally through the sleeve 28 and a coiled compression spring 36 surrounds the rod within the sleeve. This spring bears at its lower end against a tapered abutment formation 37 at the lower end of the sleeve and at its upper end against an abutment washer 38 secured on the rod and resiliently urges the rod 35 in a direction away from the reel 26.

A stop member 39 having a shoulder on its lower end is secured to the end of the reel axle 22 remote from the nut 24 and this stop has spaced apart lug formations 40 disposed one at each side of the rod 35 to constitute a guide for the rod. A pin 41 projects laterally from the rod 35 near the lower end of the rod and is engageable under the lower end of the stop 39 to hold the rod 35 in position with the spring 36 compressed.

A cam trip member 42 is carried by the reel at the end of the latter adjacent the rod and this trip member is engageable with the rod to push the lower end of the rod outwardly away from the reel and thereby release the pin 41 from the stop 40 when the reel is subjected to a line pull to thereby free the rod for movement by the spring 36 in a direction away from the reel.

An elongated flag support 43 extends along the rod 35 spaced from and substantially parallel to the rod and this support has a curved upper end terminating in an eye formation 44 which receives the screw threaded upper end portion of the rod 35 and bears against an abutment washer 45 secured on the rod near the upper end of the latter. A cap nut 46 is threaded onto the screw threaded upper end of the rod 35 and bears against the eye formation 44 of the flag support to secure the flag support on the rod. A signal flag 47 is carried by the support 43 and is raised when the rod 35 is released and raised by the spring 36 to indicate a strike by a fish. When the flag is fully raised it extends above the upper end of the support 10 so that the fisherman will have no difficulty in telling the signaling position of the flag.

A transverse wall 50 is disposed in the tubular support 10 intermediate the length of the support and a sleeve 51 secured to this wall receives the bolt 17. A flashlight battery 52 is received in the tubular support above the partition wall 50 and is supported on the partition wall by a coiled compression spring 53.

A sleeve 54 of transparent, electrically insulative material is disposed in the support immediately above the battery 52 and extends to the upper end of the support. The lower end of this sleeve is open and the upper end is closed by an end wall 55 having a central aperture therein. A strip 56 of electrically conductive material extends longitudinally of the sleeve 54 against the inner surface of the sleeve and has end portions directed inwardly of the sleeve substantially perpendicular to the intermediate portion of the strip.

A bulb socket 57 is mounted on the lower end portion 58 of the strip 56 and has its center contact in electrically conductive engagement with the center contact of the battery 52, the bulb socket 57 receiving the bulb 57'. A bolt 59 extends through the aperture in the end wall 55 of the sleeve 54 and has its head disposed at the inner side of this end wall. A compression spring 60 extends from the upper end portion 61 of the strip 56 to the head of the bolt 59 and a nut 61 is threaded onto the bolt and bears against the upper or outer surface of the end wall 55. A contact lever 62 has near one end an aperture receiving the bolt 59 and this lever projects from the bolt towards the rod 35. A second nut 63 is threaded onto the bolt for clamping the lever 62 between itself and the nut 61 and a hollow cap 64 of electrically insulative material rests on the upper end of the support 10 and has an aperture in its end wall through which the bolt 59 extends. A nut 65 is threaded onto the bolt and bears against the upper end of the cap 64. Electrically insulative material 66 surrounds the bolt 59 within the cap 64 between the nut 63 and the end wall of the cap and the cap is provided with an opening in its side wall through which the lever 62 projects.

A contact wire 67 is secured at its upper end to the eye formation 44 of the flag holder and depends from this eye formation between the sleeve 28 and the support 10.

When the rod 35 is released to raise the flag 47 the wire 67 contacts the outer end of the lever 62. As the support 10, the partition 50, the strip 56, the bolt 59, the lever 62, the wire 67, the rod 35 and the sleeve 28 are all formed of electrically conductive material an energizing circuit for the light bulb is completed when the wire 67 engages the lever 62.

In order to render the electric signal device inoperative when not needed, the cap 64 is rotated relative to the support 10 moving the lever 62 away from a position at which it will be contacted by the wire 67 when the rod is released.

The sleeve 54 extends over the openings 12 in the support and this sleeve being of transparent material the light from the light bulb will shine through the sleeve and the window openings in the support to provide a signal light.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for fishing through ice comprising an elongated support, a clamp secured to said support intermediate the length of the latter, a bar secured to said support by said clamp and movable between a folded position in which it extends along the support and an extended position in which it extends substantially perpendicular to said support for supporting the latter in an upright position in a fishing hole in ice, a reel axle secured to said support at one end thereof, a line carrying reel journaled on said axle, a sleeve secured to said support and extending longitudinally of said support intermediate the length thereof, a rod extending slidably through said sleeve, a spring acting between said sleeve and said rod resiliently urging said rod in a direction away from said reel, a stop member mounted on said reel axle and engageable with means carried by said rod to hold said rod in position to load said spring, a trip member mounted on said reel and engageable with said rod to release the latter from said stop for movement by said spring when said reel is subjected to a line pull, a signal device carried by said rod at the other end thereof, a signal light carried by said support at the other end of the latter, an energizing circuit operatively connected to said signal light, and means carried by said support and engageable by said signal device when said rod is released to complete the energizing circuit for said signal light.

2. Apparatus for fishing through ice comprising an elongated support, means mounted on said support intermediate the length thereof for holding said support in an upright position in a fishing hole in ice, a line carrying reel journaled on an axle mounted on said support at one end of the latter, means extending longitudinally of said support providing a guideway, a rod mounted on said support by said guideway for movement longitudinally of said support, spring means acting between said support and said rod resiliently urging said rod in a direction away from said reel, stop means carried by said axle and engageable with means carried by said rod to hold the latter in position to maintain said spring means in loaded condition, a trip member carried by said reel and engageable with said rod when said reel is subjected to a line pull to release said rod from said stop means for movement of said rod by said spring means, a signal device carried by said rod at the end thereof remote from said reel, a signal light carried by said support at the end thereof remote from said reel, an energizing circuit operatively connected to said signal light, and means carried by said support and said rod and operative when said rod is released to complete the energizing circuit for said signal light.

3. Apparatus for fishing through ice comprising an elongated support, means mounted on said support intermediate the length thereof for holding said support in an upright position in a fishing hole in ice, a line carrying reel journaled on an axle mounted on said support at one end of the latter, means extending longitudinally of said support providing a guideway, a rod mounted on said support by said guideway for movement longitudinally of said support, spring means acting between said support and said rod resiliently urging said rod in a direction away from said reel, stop means carried by said axle and engageable with means carried by said rod to hold the latter in position to maintain said spring means in loaded condition, a trip member carried by said reel and engageable with said rod when said reel is subjected to a line pull to release said rod from said stop means for movement of said rod by said spring means, a signal device carried by said rod at the end thereof remote from said reel, a signal light carried by said support at the end thereof remote from said reel, an energizing circuit operatively connected to said signal light, and means carried by said support and said rod and operative when said rod is released to complete the energizing circuit for said signal light, said last named means being manually adjustable to render said signal light operative or inoperative.

4. Apparatus for fishing through ice comprising an elongated tubular support of electrically conductive material, a bar releasably secured to said support intermediate the length of the latter and extending perpendicularly to opposite sides of the support for supporting the latter in an upright position in a fishing hole in ice with one end in the water below the ice and its other end positioned above the ice, a reel axle secured to and projecting perpendicularly from said support at said one end thereof, a line carrying reel journaled on said axle, a sleeve secured to said tubular support and extending longitudinally of the latter, a rod extending slidably through said sleeve and having a length substantially as great as the length of said support, a spring in said sleeve engaging said rod and resiliently urging the latter longitudinally of said sleeve in a direction away from said reel, a stop member on said reel axle engageable with a pin carried by said rod to hold the latter in position with said spring loaded, a trip member on said reel engageable with said rod to release the latter from said stop member, a sleeve of electrically insulative material mounted in said support at the other end of the latter and having an end wall at the outer end thereof and an open inner end, a bracket of electrically conductive material mounted in and extending longitudinally of the last mentioned sleeve, a bulb socket mounted on said bracket at the open inner end of said last mentioned sleeve, a light bulb mounted in said socket, a battery disposed in said support and having one end in contact with said bulb, means at the other end of said battery supporting said battery in and electrically connecting it to said support, a contact lever of electrically conductive material pivotally mounted at one end on the end wall of said last mentioned sleeve and electrically connected to said bracket at the end of the latter remote from said bulb socket, said lever projecting outwardly of said support and being electrically insulated therefrom, and a contact wire secured to said rod at the end of the latter remote from said reel and extending along said support, said contact wire being slidably engageable with said contact lever when said rod is releasable from said stop member to complete an energizing circuit for said lamp bulb.

5. Apparatus for fishing through ice comprising an elongated tubular support of electrically conductive material, a bar releasably secured to said support intermediate the length of the latter and extending perpendicularly to opposite sides of the support for supporting the latter in an upright position in a fishing hole in ice with one end in the water below the ice and its other end positioned above the ice, a reel axle secured to and projecting perpendicularly from said support at said one end thereof, a line carrying reel journaled on said axle, a sleeve secured to said tubular support and extending longitudinally of the latter, a rod extending slidably through said sleeve and having a length substantially as great as the length of said support, a spring in said sleeve engaging said rod and resiliently urging the latter longitudinally of said sleeve in a direction away from said reel, a stop member on said reel axle engageable with a pin carried by said rod to hold the latter in position with said spring loaded, a trip member on said reel engageable with said rod to release the latter from said stop member, a sleeve of electrically insulative material mounted in said support at the other end of the latter and having an end wall at the outer end thereof and an open inner end, a bracket of electrically conductive material mounted in and extending longitudinally of the last mentioned sleeve, a bulb socket mounted on said bracket at the open inner end of said last mentioned sleeve, a light bulb mounted in said socket, a battery disposed in said support and having one end in contact with said bulb, means at the other end of said battery supporting said battery in and electrically connecting it to said support, a contact lever of electrically conductive material pivotally mounted at one end on the end wall of said last mentioned sleeve and electrically connected to said bracket at the end of the latter remote from said bulb socket, said lever projecting outwardly of said support and being electrically insulated therefrom, and a contact wire secured to said rod at the end of the latter remote from said reel and extending along said support, said contact wire being slidably engageable with said contact lever when said rod is released from said stop member to complete an energizing circuit for said lamp bulb and said contact lever being movable away from the path of said contact wire to maintain said lamp bulb un-energized when said rod is released from said stop member.

ALBERT P. BRUNDAGE.

References Cited in the file of this patent

UNITED STATES PATENTS

| Number | Name | Date |
|---|---|---|
| 2,032,537 | Kozikowski | Mar. 3, 1936 |
| 2,114,529 | Goodhue | Apr. 19, 1938 |
| 2,439,451 | Clark | Apr. 13, 1948 |
| 2,502,231 | Oberg | Mar. 28, 1950 |